No. 883,952. PATENTED APR. 7, 1908.
S. A. HAND.
ATTACHMENT FOR GEAR CUTTING, PLANING, AND MILLING MACHINES.
APPLICATION FILED AUG. 26, 1907.
2 SHEETS—SHEET 1.
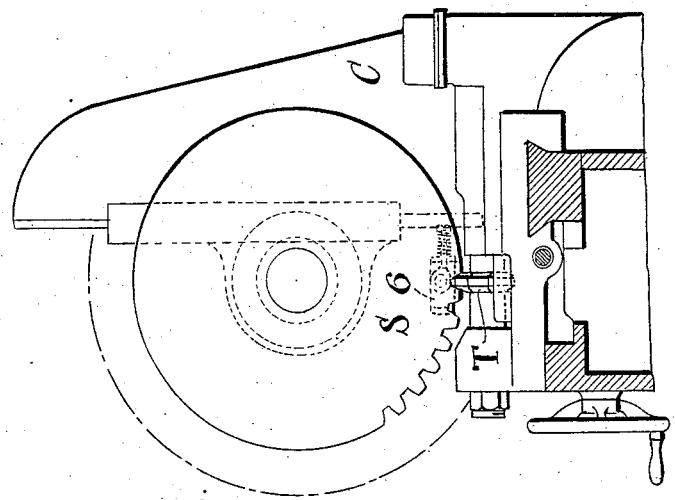
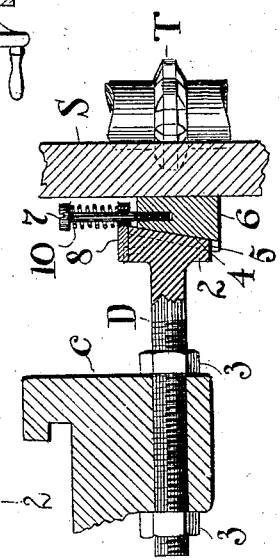
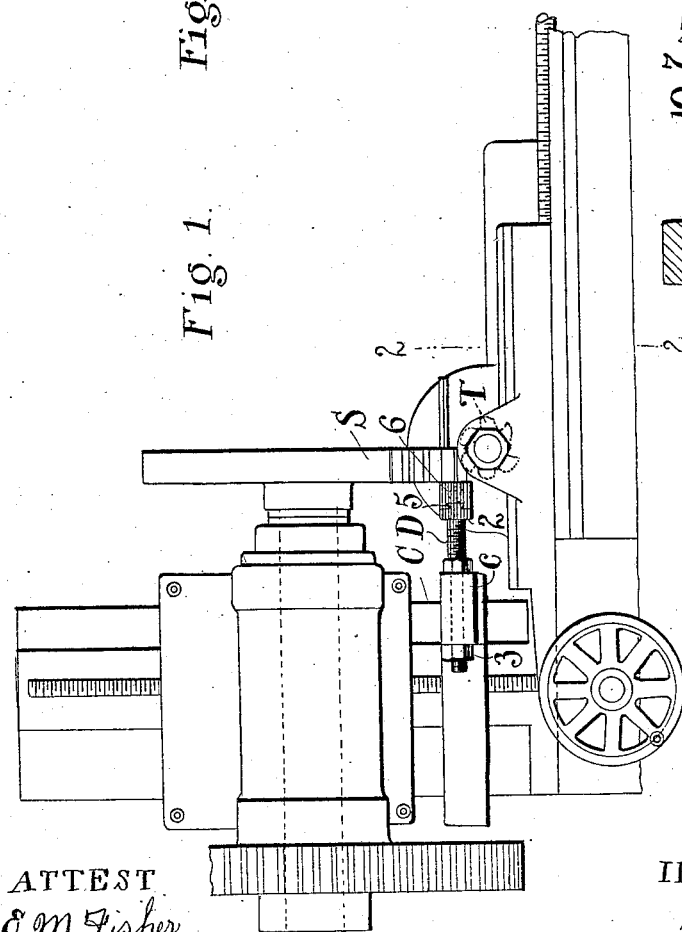
ATTEST
E. M. Fisher.
J. O. Mussun.
INVENTOR.
Samuel A. Hand
BY Fisher & Moser —ATTYS No. 883,952. PATENTED APR. 7, 1908.
S. A. HAND.
ATTACHMENT FOR GEAR CUTTING, PLANING, AND MILLING MACHINES.
APPLICATION FILED AUG. 26, 1907.
2 SHEETS—SHEET 2.
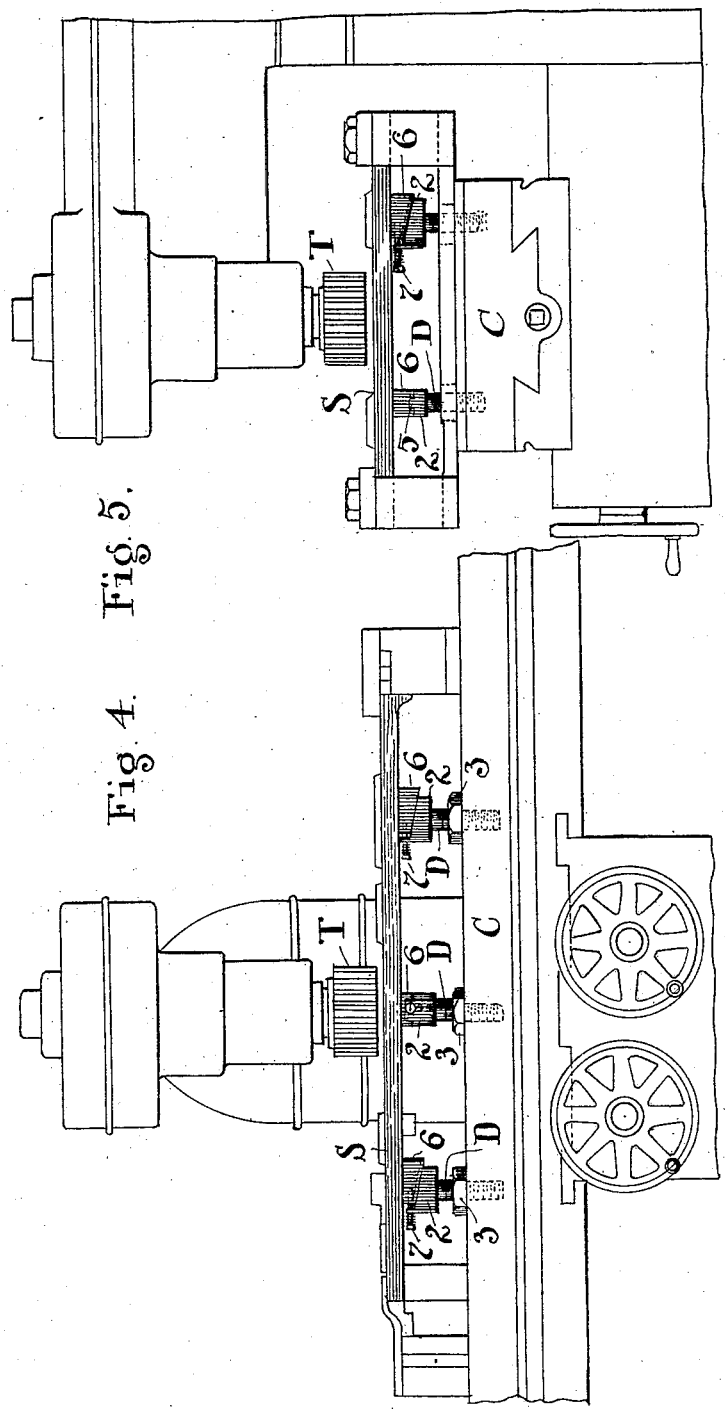
ATTEST
E. M. Fisher.
J. C. Mussun.
INVENTOR
Samuel A. Hand
BY Fisher & Moser ATTYS.

UNITED STATES PATENT OFFICE.

SAMUEL A. HAND, OF CLEVELAND, OHIO, ASSIGNOR TO THE CHANDLER & PRICE COMPANY, OF CLEVELAND, OHIO, A CORPORATION.

ATTACHMENT FOR GEAR-CUTTING, PLANING, AND MILLING MACHINES.

No. 883,952.     Specification of Letters Patent.     Patented April 7, 1908.

Application filed August 26, 1907. Serial No. 390,084.

*To all whom it may concern:*

Be it known that I, SAMUEL A. HAND, a citizen of the United States, residing at Cleveland, in the county of Cuyahoga and State of Ohio, have invented certain new and useful Improvements in Attachments for Gear-Cutting, Planing, and Milling Machines, and do declare that the following is a full, clear, and exact description of the invention, which will enable others skilled in the art to which it appertains to make and use the same.

My invention relates to an attachment for gear-cutting, planing and milling machines and the like wherein the work is liable to chatter or vibrate under the effect of the cutting tool and thus also cause the work to be rough and defective, all substantially as shown and described and particularly pointed out in the claims.

In the accompanying drawings, Figure 1 is an elevation of a gear cutting machine having my invention operatively incorporated therewith, and Fig. 2 is a cross sectional elevation on a line corresponding substantially to 2—2, Fig. 1. Fig. 3 is an enlarged sectional elevation of the immediate and certain associated parts of the rest, as hereinafter fully described. Fig. 4 is an elevation of a milling machine, showing several applications of my invention, and Fig. 5 is a view at right angles to Fig. 4.

Reduced to its essential characteristics or parts the invention is more or less fully disclosed in Fig. 3, and the other views serve rather to show the range of its application and methods of use, the idea in all cases being to take up slack, spring, or vibration in the stock or work acted upon by the cutter and which manifests itself in chattering noise and effects. Hence, I do not place any special stress on the kind of machine or the manner of its operation, nor upon the character of the work done provided the machine and work be adapted to utilize my improvement for the purposes specified.

Now, having reference to Fig. 3, c represents a rigid and fixed part of machine frame C, considered as a whole, and D is the supporting member of the attachment which is removably fixed in this particular frame by nuts 3 engaging the threaded shank of said support and locking it firmly in place. The said support has a head 2 with a face 4 slightly inclined transversely from a right angle to the axis of said support and provided with a dove-tailed rib 5 centrally of said face, and a substantially wedge shape tightening block 6 has a dove-tailed groove or channel matching said rib and adapted to slide thereon. Said block has its inner side inclined sufficiently to make up for the lateral inclination of face 4, so as to bring the outer bearing side or surface thereof exactly square with the axis of support D. Said block is held in working position by its dove tailed engagement with head 2 and a headed stem or rod 7 threaded into the reduced or narrower end of said block and supported in a plate or projection 8 fixed on head 2 adapted to extend across the end of said block. A spiral spring 10 is engaged about said rod 7 between its head and projection 8 and adapted to draw upon said block in its wedging or tightening direction and thus tighten it more and more against the work as the block is drawn further in by spring 10.

The stock or material worked upon in cutting or milling is represented by S in the several figures, and the tool by T, which may be fed to the stock or the stock to the tool, according to the machine. In the gear cutting arrangement, Figs. 1 and 3, the attachment is removably fixed upon main frame C, or a part rigid therewith, in such relation that the flat outer surface of wedge or block 6 will bear with its full face against the side of the stock or gear and with the parts in such adjustment relatively that there will be plenty of tightening room in said block under the tension of spring 10 to take up all vibrations induced by the cutting tool and hold the stock perfectly firm and rigid, thus preventing the usual chattering and quieting the operation. This also and obviously enables the cutting tool to do smooth and accurate work, which is one of the material advantages of the invention. The same effect is obtained when the device is placed in such working relation as is disclosed in Figs. 4 and 5, wherein it comes beneath the work or plate, and is somewhat differently supported on frame C from that above described. Obviously, also, the invention is complete as an article of manufacture and is available as such to be used here or there according to the style of machine.

I have described head 2 and block 6 as having slidable engagement with a rib on one and channel in the other, but these may be reversed as to said parts and serve the same purpose, and any equivalent of said connections may be substituted therefor, the essential idea being that block or wedge 6 should be confined in slidable relations on said head and started in such position in respect to the work that it will have all the needed take-up when the work begins. Adjustment by nuts 3 fixes initial relations, and the point of engagement is approximately opposite the tool, allowing for clearance.

Obviously, chattering is prevented by spring 10 taking up wedge or key 6 as vibrations occur and thus locking the wedge so tightly upon the stock that chattering is prevented.

What I claim is:—

1. A device to prevent chattering in gear cutting and other machines, comprising a supporting member provided with a screw threaded shank and nuts thereon to adjustably fix the same on a support and said device having an inclined outer face, a substantially wedge shaped block slidably engaged on the face of said device, a headed stem engaged in the narrower end of said block and supported from said device, and a spring about the outer portion of said stem beneath the head thereon to tighten the said block.

2. The combination of a gear cutting or other machine with an attachment adjustably fixed thereon and adapted to prevent chattering in the cutting operation, said attachment having a screw threaded shank adapted to fasten the same and a head with an outer transversely inclined face, a substantially wedge shaped block having dovetailed slidable engagement with said head, and means to normally draw said block into tightening position comprising a headed stem fixed in said block, a spring support fixed on said head and a spring engaged about said stem and resting on said support.

In testimony whereof I sign this specification in the presence of two witnesses.

SAMUEL A. HAND.

Witnesses:
R. B. MOSER,
F. C. MUSSUN.